United States Patent [19]
Wolfe-Taylor et al.

[11] Patent Number: 4,733,017
[45] Date of Patent: Mar. 22, 1988

[54] ELECTRICAL OUTLET COVER PLATE

[76] Inventors: Sherry J. Wolfe-Taylor, 19114 Wickfield Ave., Warrensville Hts., Ohio 44122; Donald B. Keys, 1998 Nelawood Ave., East Cleveland, Ohio 44112

[21] Appl. No.: 937,403

[22] Filed: Dec. 3, 1986

[51] Int. Cl.⁴ .............................................. H02G 3/14
[52] U.S. Cl. ...................................... 174/67; 220/242; 220/348; 439/136; 439/145
[58] Field of Search ............... 220/241, 242, 345; 346, 220/348; 339/36; 174/67

[56] References Cited

U.S. PATENT DOCUMENTS

| | | | |
|---|---|---|---|
| 2,988,242 | 6/1961 | Kneip | 220/242 |
| 3,068,442 | 12/1962 | Kubik et al. | 220/242 |
| 3,222,631 | 12/1965 | Cohen | 220/242 |

*Primary Examiner*—Stephen Marcus
*Assistant Examiner*—Nova Stucker

[57] ABSTRACT

A safety improvement in cover plates for electrical outlets. A cover plate for electrical outlets having sets of a spring-loaded sliding traverse plates which shift to open and close electrical wall outlets used in residential, commercial, and industrial locations. The sliding spring-loaded traverse plates being positioned between sets of tracks which are laterally parallel to outlet holes located in the cover plate, and each traverse plate having a hole which may be manually positioned to be in line with outlet holes located in the cover plate. When holes in the traverse plates and the cover plates are in line, the prongs of male terminals may be inserted into the female recepticle. When the male terminal is removed from the female recepticle, the traverse plates automatically spring into a closed positions thereby shielding the said female recepticle, which thereby prevents a child from being electricuted by sticking a small metal object into female electrical outlets.

2 Claims, 6 Drawing Figures

ELECTRICAL OUTLET COVER PLATE

SUMMARY OF THE INVENTION

The present invention is directed generally to an improvement in cover plates for standard wall electrical outlets. The present invention is particularly directed to an electrical outlet cover plate with positioning guides, for sets of two spring-loaded traverse plates for each terminal.

Said guides serves to limit said traverse plates movements to lateral reciprocating movements across each electrical receptacle hole located in said cover plate. The said traverse plates, each having a hole located therein and said hole in traverse plates being the same size and shape as the two electrical outlet holes located in the said cover plate.

Each said traverse plate being positioned in said guides in a manner whereby they may be independently and manually shifted into a position such that the sets of holes located in said cover plate and the holes located in said traverse plates are in line, thereby exposing said electrical outlet for the insertion of the male electrical terminal prongs.

When male electrical terminals are extracted from each independent recepticle, said traverse plates thereby automatically shifts moving solid areas of each said traverse plate to cover each said recepticle.

When either of said independent electrical outlets are not in use, each said outlet being covered by the solid areas of two independent sets of shifting traverse plates.

It is a primary objective of the present invention to provide a cover plate for electrical outlets which requires two hands to insert male terminal prongs into each said recepticle thereby requiring the physical and mental coordination of a mature person such to minimize the potential danger of possible electricution of children or infants resulting from playing with or sticking objects into electrical outlets.

A BRIEF DESCRIPTION OF THE DRAWINGS

DESCRIPTION OF THE INVENTION

Wth reference to the drawings, it will be seen that the illustrated embodiment of the present invention includes a substantially flat rectangular cover plate 1, for a standard electrical outlet 15. The outer edge on the bottom side of the cover plate 1 having a narrow and slightly raised border 12 extending downward from the bottom surface of the cover plate 1. The cover plate 1 and the raised border 12 being preferably formed of a rigged plastic or the like.

Figure 1:
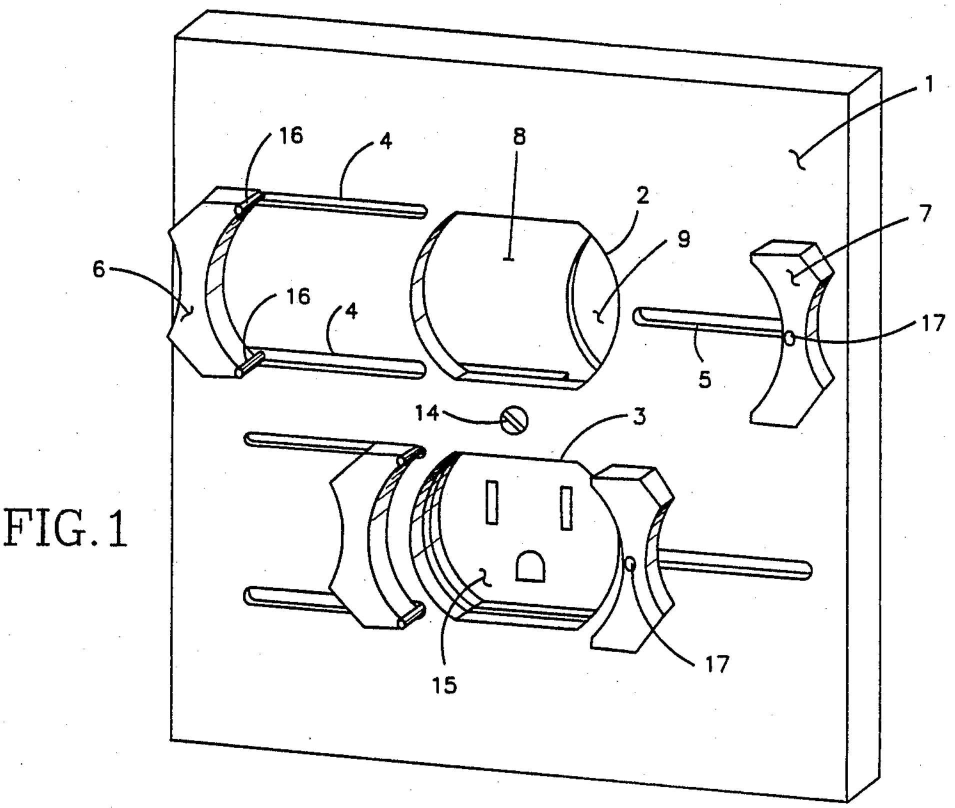
FIG. 1 is a perspective view of the electrical outlet cover plate embodying the invention.

FIG. 1 shows the cover plate 1 having two standard outlet holes 2 and 3 located therein.

Figure 2:
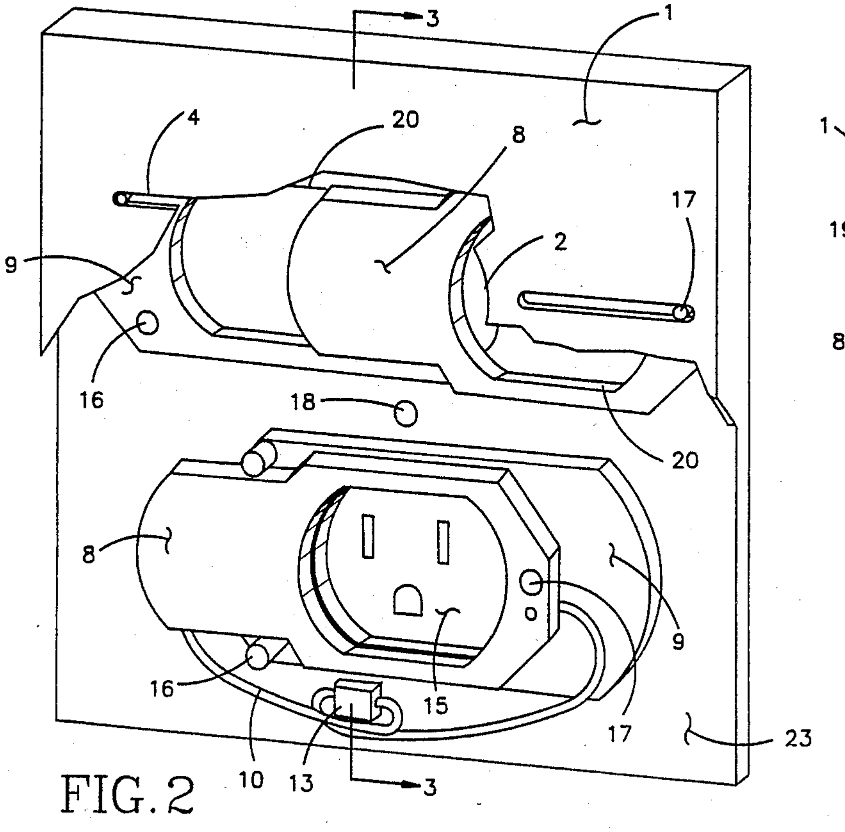
FIG. 2 is a fragmented frontal view with portions of the top cover plate removed exposing sections of sets of spring-loaded traverse plates and springs.
Figure 3:
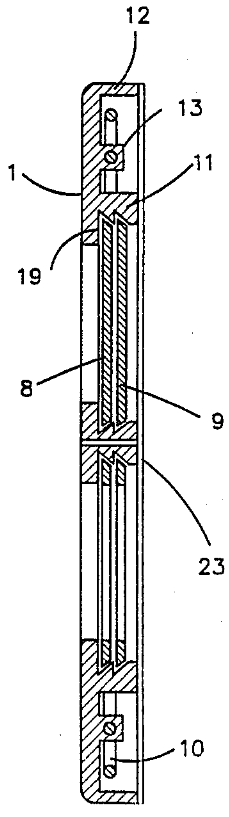
FIG. 3 is a cross-sectional view taken along the line of 3—3 in FIG. 2.
Figure 4:
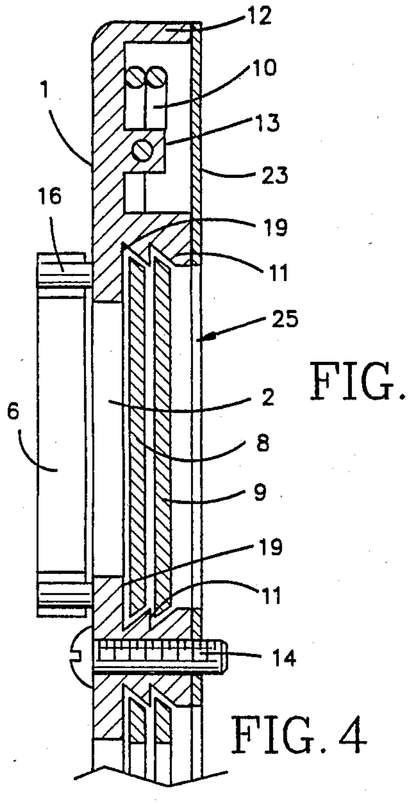
FIG. 4 is an enlarged fragmented cross-sectional view of FIG. 3. showing spring-loaded traverse plates positioned in tracks.

With reference to FIGS. 2–4 it will be seen that underlining each outlet hole 2 and 3 are sets of traverse plates 8 and 9, preferably formed of a plastic or the like. Each set of traverse plates 8 and 9 are positioned one over the other in independent sets of slotted tracks 11 and 19 which are located above and below each outlet hole 2 and 3. The tracks 11 and 19 are affixed to the bottom surface of the cover plate 1 and are in line with and are laterally parallel to the outlet holes 2 and 3. The sets of tracks 11 and 19 are thus positioned to contain and limit the independent movements of each traverse plates 8 and 9 to reciprocating lateral movements across the outlet access holes 2 and 3 located in the cover plate 1.

Figure 6:
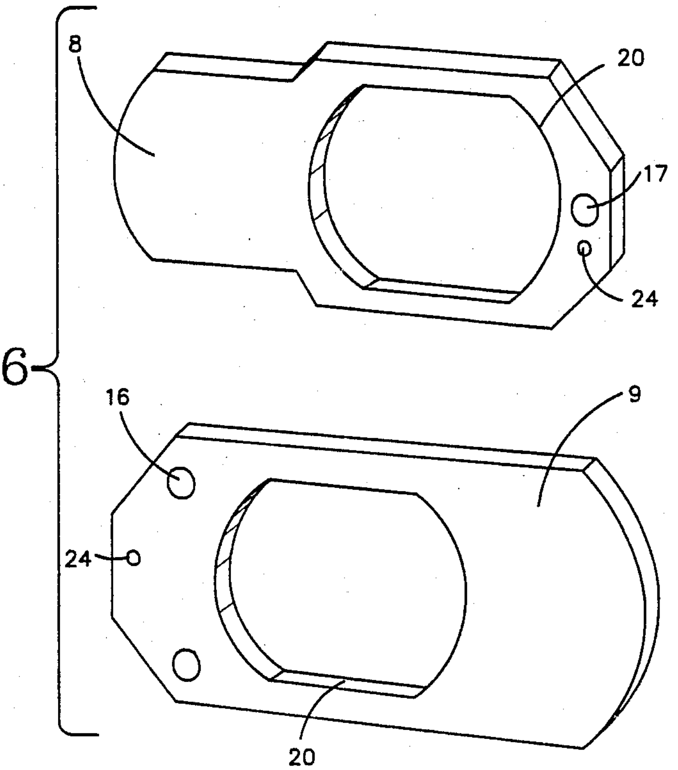
FIG. 6 is an isolated view of a set of traverse plates.
Figure 5:
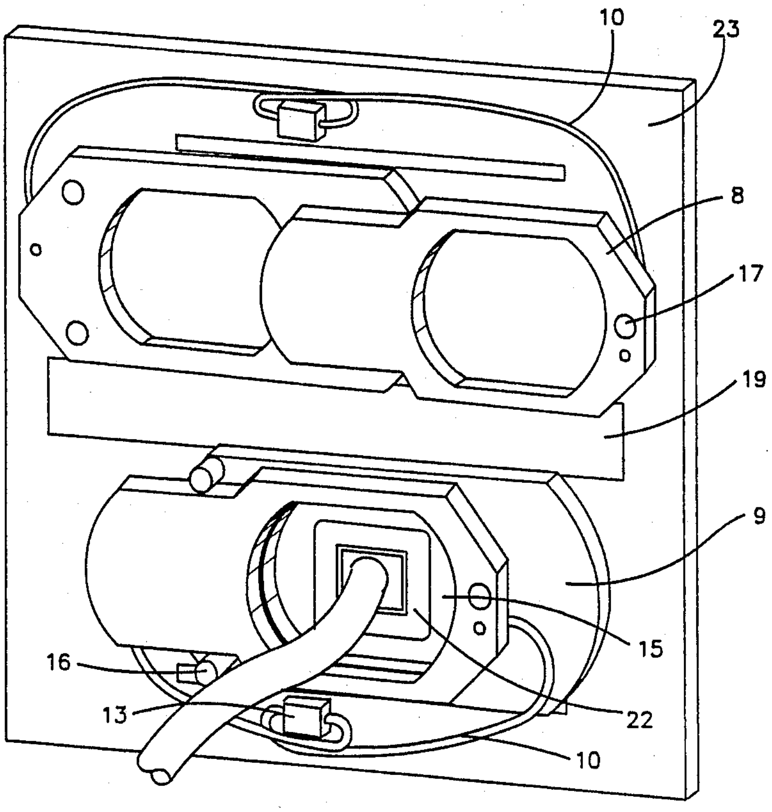
FIG. 5 is a frontal view with the top cover plate completely removed showing tracks, traverse plates, springs, and an electrical plug being inserted into one of said outlets.

FIGS. 2, 5, and 6 shows the traverse plates 8 and 9 each having an opening 20 which is the same shape and size as the openings 2 and 3 located in the cover plate 1.

With reference to FIG. 2 and FIG. 5, it will be seen that the openings 20 located in each set of independently moving traverse plates 8 and 9 may be independently positioned laterally to be in line with each independent access hole 2 and 3 located in the cover plate 1.

FIG. 1, FIG. 2, and FIG. 4 shows bosses or pins 16 and 17 being affixed to each traverse plate 8 and 9. The bosses 16 and 17 extending upwards and through the aligned holes 4 and 5 located in the cover plate 1.

With reference to FIGS. 1–6, it will be seen that bosses 16 and 17 which extend upwards through the slots 4 and 5 located in the cover plate 1 are affixed to positioning levers 6 and 7; bosses 17 attaching positioning levers 7 to traverse plates 8 and bosses 16 attaching positioning levers 6 to traverse plates 9, respectively.

With reference to FIG. 1, FIG. 2, and FIG. 5, it will be seen that when the positioning levers 6 and 7 of either set of traverse plates 8 and 9 are both moved inward to their innermost positions, the openings in the traverse plates 8 and 9 are in line with the access hole 2 or 3 of the respective outlet 15 and thereby exposing the outlet 15 for insertion of electrical plug 22.

According to FIGS. 1–2, when electrical plug 22 is extracted from outlet 15, the traverse plates 8 and 9 are simultaneously pulled laterally outward into opposite directions by a coil spring 10 which is looped through the eye 13 located on the bottom surface of cover plate 1. The spring 10, is attached by means of a small hole 23 located on the outer edge of each traverse plate 8 and 9.

According to FIGS. 1 and 2 the outward movement of each traverse plate 8 and 9 to each outermost points positions the solid area of each traverse plate 8 and 9 into the areas under access holes 2 and 3, thus shielding the outlets 2 and 3 when not in use.

According to FIG. 1, the screw 14, located in the center of the cover plate 1 between the two access holes 2 and 3, is an elongated standard screw (inserted through hole 18 FIG. 2) used for mounting standard-type outlet cover plates to wall.

According to FIG. 2–FIG. 5 it will be seen that a thin bottom cover plate 24 having dimensions which are in length and width the same as the top cover plate 1 said bottom plate 24 is affixed to the raised boarder 12 located on the back surface of the cover plate 1. The bottom cover plate 24 having the access holes 25 aligned with access holes 2 and 3 located in the top cover plate 1.

What is claimed:

1. A cover plate having means for covering electrical outlets of the standard type used in residential, commercial and industrial locations, said cover plate including a pair of shutters for each outlet of said standard type electrical outlets, each shutter of said pair being spring-loaded and having an access hole located therein, each shutter of said pair including an independent-positioning lever to shift said shutter, said shutter access holes when shifted being alignable with each other and also with a corresponding access hole located in said cover plate, there being one outlet of said standard type electrical outlets exposed for each said pair of shutters shifted into such alignment, thereby allowing the insertion of an electrical-plug terminal.

2. A cover plate for electrical outlets having standard outlet holes located therein, and said cover plate having sets of two independent laterally-shifting traverse plates underlining each said outlet hole and said traverse plates being flatly positioned one over the other in independent sets of guides being aligned with and laterally parallel to the said outlet holes located in said cover plate, said guides serves to contain and limit the independent movements of each said traverse plate to lateral reciprocating movements across said outlet access holes located in said cover plate, each traverse plate having an opening being the same shape and size and being laterally aligned with the outlet holes located in the said cover plate and said lateral movements of said traverse plates at certain points positioning said openings in each set of independent and laterally-shifting traverse plate to be in line with said outlet holes located in said cover plate and thereby exposing electrical outlet for insertion of electrical plug and into said outlet, the said inserted electrical plug forcing said traverse plates to remain in said aligned positions exposing said electrical outlet, when said electrical plug is extracted from said outlet, the said traverse plates, by springs, being simultaneously pulled laterally into positions whereby solid areas of said traverse plates are positioned under each said outlet access hole and thereby shielding each said outlet with a set of two independently shifting traverse plates.

* * * * *